(12) United States Patent
Piper et al.

(10) Patent No.: US 12,553,913 B2
(45) Date of Patent: Feb. 17, 2026

(54) SYSTEM FOR TRANSPORTING AND MIXING SAMPLES

(71) Applicant: Siemens Healthcare Diagnostics Inc., Tarrytown, NY (US)

(72) Inventors: Henry-Joseph Piper, Stroudsburg, PA (US); Christopher Glielmi, Madison, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 754 days.

(21) Appl. No.: 17/904,871

(22) PCT Filed: Feb. 23, 2021

(86) PCT No.: PCT/US2021/019276
§ 371 (c)(1),
(2) Date: Aug. 23, 2022

(87) PCT Pub. No.: WO2021/173577
PCT Pub. Date: Sep. 2, 2021

(65) Prior Publication Data
US 2023/0129582 A1  Apr. 27, 2023

Related U.S. Application Data

(60) Provisional application No. 62/980,942, filed on Feb. 24, 2020.

(51) Int. Cl.
*G01N 35/04* (2006.01)
*G01N 35/00* (2006.01)

(52) U.S. Cl.
CPC ........ *G01N 35/04* (2013.01); *G01N 35/00732* (2013.01); *G01N 2035/00524* (2013.01);
(Continued)

(58) Field of Classification Search
CPC ............ G01N 35/04; G01N 35/00732; G01N 2035/00524; G01N 2035/00752;
(Continued)

(56) References Cited

U.S. PATENT DOCUMENTS

| 3,622,128 A | 11/1971 | Geiser |
| 4,861,553 A | 8/1989 | Mawhirt et al. |

(Continued)

FOREIGN PATENT DOCUMENTS

| JP | H10-137569 A | 5/1998 |
| JP | 2005-321306 A | 11/2005 |
| JP | 2005-537127 A | 12/2005 |

OTHER PUBLICATIONS

Heterotrophic Bacteria, Dec. 2015, Hach Company, Edition 8, pp. 1-8 (Year: 2015).*

(Continued)

*Primary Examiner* — John McGuirk

(57) ABSTRACT

A sample transport system has a carrier configured to hold a sample tube for a sample to be transported and mixed, a transporter configured to support the carrier, a guide portion configured to impart motion to the carrier on the transporter and deliver the carrier to a destination location, and a controller. The controller is configured to identify instructions associated with the sample, the instructions including a movement profile configured to cause mixing of the sample, communicate with the guide portion to cause the carrier to follow the movement profile on the transporter to cause the mixing of the sample, and deliver the sample to the destination location.

11 Claims, 7 Drawing Sheets

(52) U.S. Cl.
CPC .............. *G01N 2035/00752* (2013.01); *G01N 2035/0406* (2013.01); *G01N 2035/046* (2013.01)

(58) Field of Classification Search
CPC ..... G01N 2035/0406; G01N 2035/046; G01N 2035/00851; G01N 2035/0474; G01N 2035/0489; G01N 35/00584
See application file for complete search history.

(56) References Cited

U.S. PATENT DOCUMENTS

| | | |
|---|---|---|
| 7,175,334 B2 | 2/2007 | Babson et al. |
| 8,215,821 B2 | 7/2012 | Babson et al. |
| 2006/0286619 A1 | 12/2006 | Ricci et al. |
| 2008/0038827 A1 | 2/2008 | Miller et al. |
| 2009/0158863 A1 | 6/2009 | Shanafelter |
| 2014/0277699 A1 | 9/2014 | Moix et al. |
| 2014/0322706 A1 | 10/2014 | Kayyem et al. |
| 2015/0025678 A1 | 1/2015 | Mellars et al. |
| 2015/0241457 A1 | 8/2015 | Miller |
| 2016/0011224 A1 | 1/2016 | Pollack |
| 2016/0274137 A1 | 9/2016 | Baer |
| 2017/0108522 A1 | 4/2017 | Baer |
| 2018/0072445 A1 | 3/2018 | Burkhard et al. |
| 2018/0079605 A1 | 3/2018 | Koga et al. |

OTHER PUBLICATIONS

PCT International Search Report and Written Opinion dated May 4, 2021 (8 Pages).
Extended EP Search Report dated Jul. 14, 2023 of corresponding European Application No. 21761395.9, 6 Pages.

* cited by examiner

SYSTEM FOR TRANSPORTING AND MIXING SAMPLES

CROSS REFERENCE TO RELATED APPLICATION

This application claims the benefit of U.S. Provisional Patent Application No. 62/980,942, entitled "SYSTEM FOR TRANSPORTING AND MIXING SAMPLES" filed Feb. 24, 2020, the disclosure of which is hereby incorporated by reference in its entirety for all purposes.

TECHNOLOGY FIELD

The present invention relates generally to a mechanism for transporting samples for a diagnostics system, and, in particular a combined transport and mixing system for sample tubes on a carrier.

BACKGROUND

Sample testing systems, such as In vitro diagnostics (IVD) systems, enable the diagnosis of disease based on assays performed on patient fluid samples. IVD may include various types of analytical tests and assays related to patient diagnosis, and therapy that can be performed by analysis of a liquid sample taken from a patient. Assays are generally conducted with automated clinical chemistry analyzers (analyzers) onto which fluid containers, such as tubes or vials containing patient samples have been loaded. In some systems, the containers are loaded in an input/output module and transported to the analyzers by means of a track transport. Analyzers can then extract a liquid sample from the vial and combine it with various reagents in a special reaction cuvette(s) or tube(s) (i.e., a reaction vessel).

Some sample tubes need to be mixed before analysis. The current solution given by laboratory diagnostic companies is to remove the tube from the tube transport system and place it into a mixing subassembly. This solution is expensive to the customer in cost, the impact on tube turn-around time (time it takes the solution to return the sample tube to the operator once placed on a solution), the impact on result turn-around time (time it takes the solution to report a result), and laboratory space dedicated to a mixing subassembly.

One current solution for customers who do not purchase mixing subassemblies is to mix samples manually. Customers who purchase laboratory analyzers that do not readily interface directly or indirectly with mixers can automate the mixing process but must manually transport samples to the analyzers. Each of these scenarios increase labor cost and impact tube turn-around time relative to fully integrated automated mixing. The latter scenario (mixing subassembly that does not interface with analyzers) also requires laboratory space dedicated to a mixing subassembly).

The present disclosure includes a mechanism for addressing these and other problems of the prior art.

SUMMARY

In at least some embodiments, the present disclosure is directed to a sample transport system. The sample transport system includes a carrier configured to hold a sample tube for a sample to be transported and mixed, a transporter configured to support the carrier, a guide portion configured to impart motion to the carrier on the transporter and deliver the carrier to a destination location, and a controller. The controller is configured to identify instructions associated with the sample, the instructions including a movement profile configured to cause mixing of the sample, communicate with the guide portion to cause the carrier to follow the movement profile on the transporter to cause the mixing of the sample, and deliver the sample to the destination location.

In at least some embodiments, the present disclosure is directed to computer-implemented method for transporting and mixing a sample in a sample tube by a processor executing instructions from a memory. The method includes receiving mixing instructions for the sample, the mixing instructions comprising a movement profile for a carrier holding the sample tube, and providing instructions to a guide element to move the carrier along a path defined by the movement profile on a transporter.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments of the present invention include a transport system for delivering a sample to a component of a sample testing system. The transport system includes features that enable mixing of the sample through controlled movement of the sample during the transport stage. In some embodiments, the movement is controlled to sufficiently mix a sample such that a separate mixing mechanism is not required to achieve adequately-mixed solutions for testing samples.

In some embodiments, the transport system includes a transport controller that determines whether mixing is needed for a particular sample and provides instructions to controlled transport element (e.g., a transport puck) for inducing movement that causes sufficient mixing. The instructed movement may depend on, for example, the configuration of the transport system. For instance, some embodiments may include movement according to a one-dimensional track for transport. Other embodiments may include more open-surface transport systems that enable more complex motions for generating mixing.

Figure 1A:
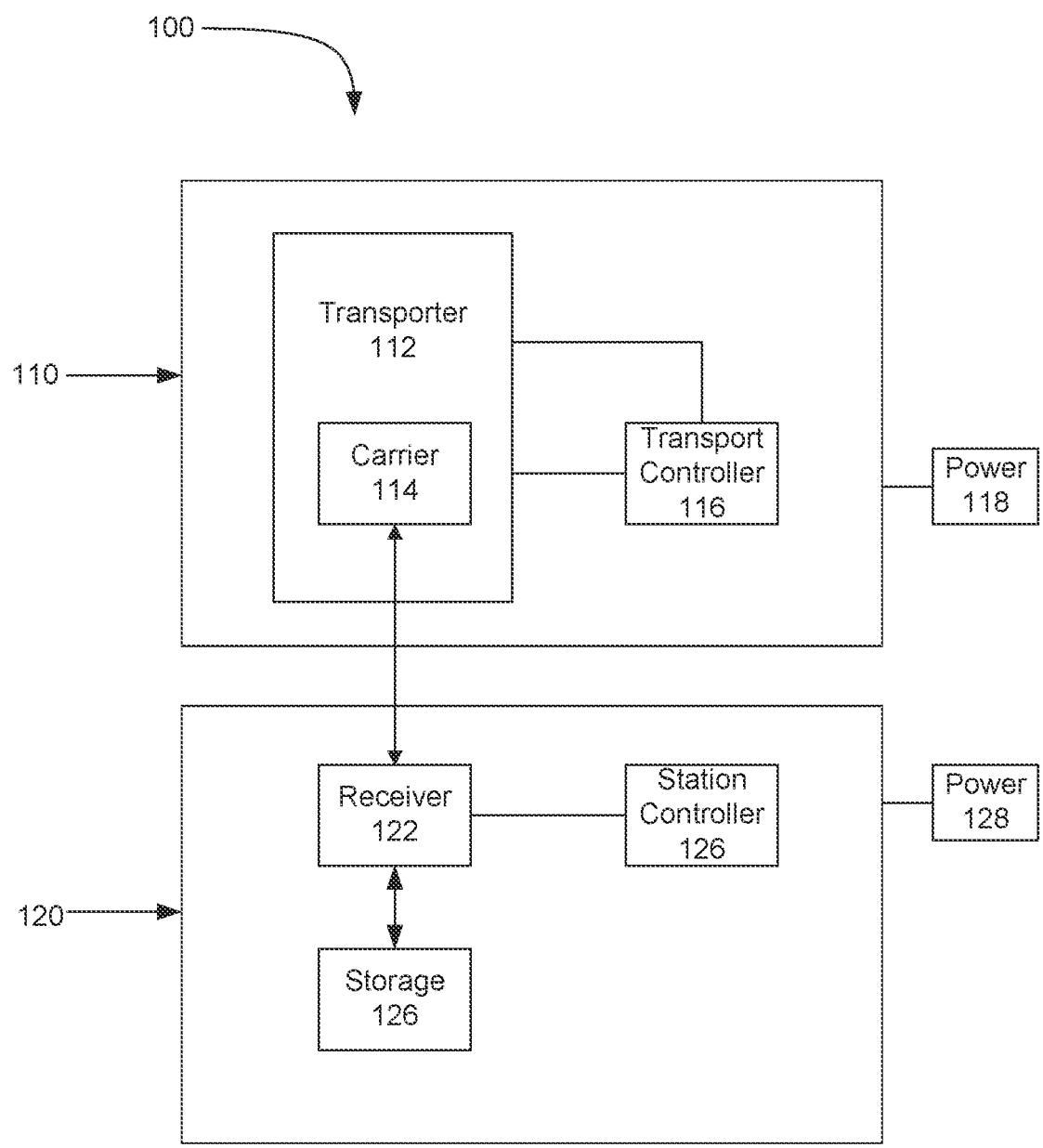
FIG. 1A is a block diagram of an exemplary sample transport and mixing system, according to disclosed embodiments.

FIG. 1A is a block diagram of an exemplary sample testing system 100. The sample testing system 100 may include a transport system 110 and a station 120. The transport system 110 may include features that deliver a sample tube to the station 120. The station 120 may be any component of any system that is configured to receive a sample, such as a sample tube, for testing of a mixed sample.

In an exemplary embodiment, the transport system 110 includes a transporter 112, a carrier 114, a transport controller 116, and a power supply 118. The transporter 112 may be a feature for physically supporting and transporting the carrier 114. The carrier 114 may be, for example, a puck or other holder for a sample (e.g., a test tube). The transport controller 116 may be, for example, a processor configured to generate instructions for controlling the movement of the carrier 114 on the transporter 112 (e.g., through electromagnetic control). The power supply 118 is configured to power the functional elements of the transport system 110.

In an exemplary embodiment, the station 120 comprises a receiving feature 122, such as a robotic arm for picking a sample off of the carrier 114. The station 120 may also include a station controller 124, a storage area 126, and a power supply 128. It should be understood that the station 120 may include any components associated with the handling of a sample received from the transport system 110. For example, the station 120 may simply include a storage area and perform no analysis function.

Consistent with disclosed embodiments, a sample testing system or other sample handling system may include the transport system 110 as a means to deliver a sample to the station 120. In certain instances, the sample may be a solution of one or more ingredients, such as a biological material and a diluting composition or marking solution to be mixed with the material. Any combination of materials to be mixed may be deposited into the sample at an originating station or manually by a technician and then automatically or manually placed in the carrier 114 of the transport system 110. The transport controller 116 may receive instructions for controlling the movement of the carrier 114 in a selected manner to mix the ingredients in the sample tube (or other container). In some embodiments, the movement of the carrier 114 may be based on the controller identifying a state or composition of the material in the sample tube.

The motion imparted on the carrier 114 by the controller may also depend on the transporter 112 and its configuration. For instance, if the transporter 112 is a bounded track such that the carrier 114 is limited to bi-directional motion along a path of the track, the controller 116 may utilize acceleration and deceleration in one or more of the two directions along the path to induce the mixing. In another example, if the transporter 112 is an open surface, the controller 116 may perform a more complex motion on the surface, such as curvilinear motion along a selected path or trajectory. In another example, the controller 116 may impart rotational motion on the carrier 114 to induce mixing of the sample.

Figure 1B:
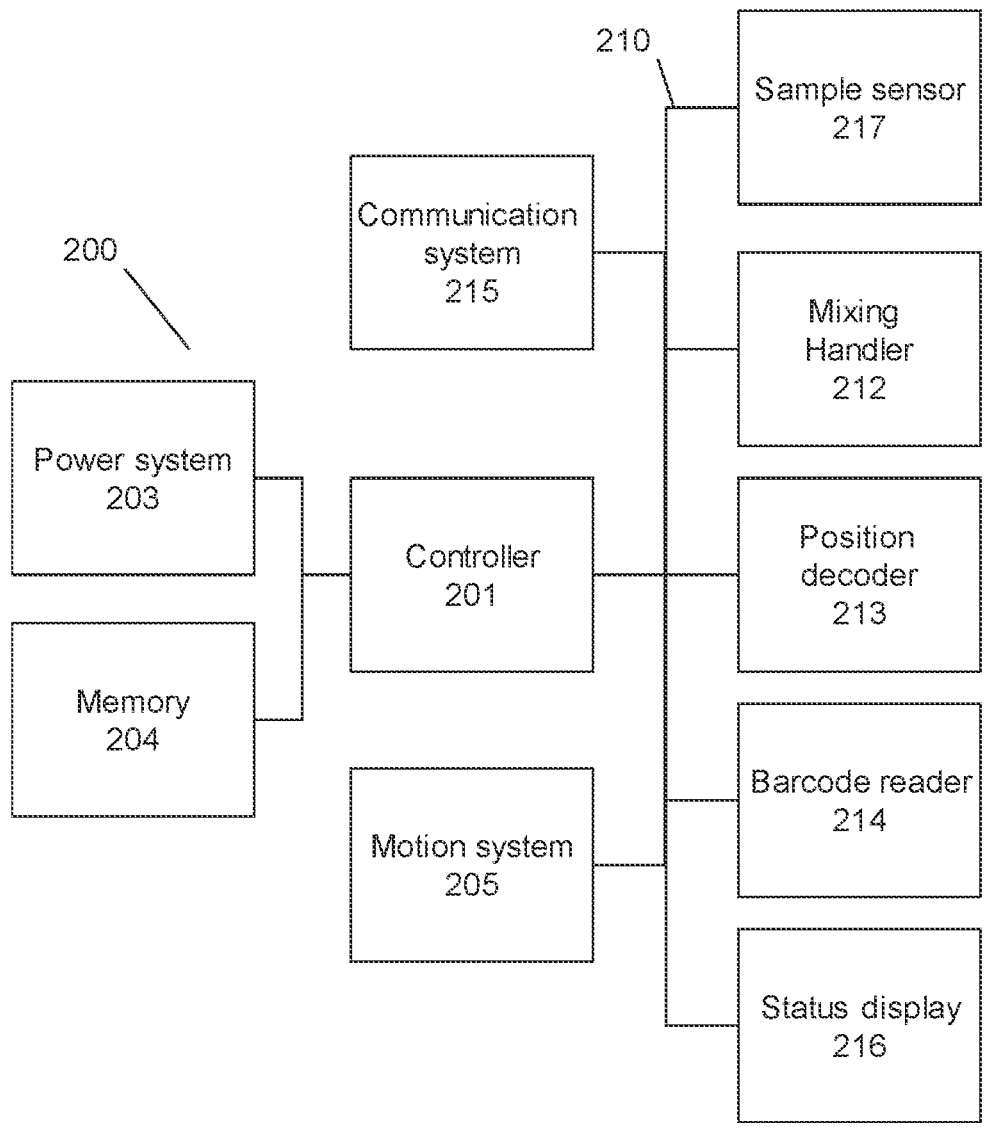
FIG. 1B is a system block diagram of the control systems including transport controllers that can be used with certain embodiments disclosed herein.

FIG. 1B shows a top-level system diagram of an exemplary configuration of an exemplary transport system 200, such as transport system 110. Transport system 200 may be controlled by a controller 201 (which may be, e.g., transport controller 116) that includes sufficient processing power to handle navigation, maintenance, motion, and sensor activities needed to operate the transport system 200. In some embodiments, transport system 200 includes a power system 203 comprising, for example, a battery.

Controller 201 may communicate with a system memory 204. System memory 204 may include data and instruction memory. Instruction memory in memory 204 includes sufficient programs, applications, or instructions to operate the transport system 200, such as to provide motion instructions to the controller 201. This may include navigation procedures as well as sensor handling applications. Data memory in memory 204 can include data about the current position, speed, acceleration, payload contents, navigational plan, identity of the carrier or payload, or other status information. By including onboard memory in transport system 200, the controller 201 can keep track of current status and use information to intelligently route carriers around the track or convey status information to the track or other carriers.

Controller 201 may also be responsible for operating a motion system 205, a mixing handler 212, a position decoder 213, a barcode reader 214, a communication system 215, a status display 216, and a sample sensor 217. These peripherals can be operated by the controller 201 via a bus 210, for example. Bus 210 can be any standard bus, such as a CAN bus, that is capable of communicating with the plurality of peripherals, or can include individual signal paths to individual peripherals. Peripherals can utilize their own power sources or the common power system 203.

Motion system 205 can include the control logic necessary for operating any of the motion systems described herein. For example, motion system 205 can include motor controllers in embodiments that use driven wheels. In other embodiments, motion system 205 can include the necessary logic to communicate with any active track systems necessary to provide a motive force to a carrier of the transport system 200. In these embodiments, motion system 205 may be a software component executed by controller 201 and utilizing communication system 215 to communicate with the handling surface (e.g., the track) and/or carriers on the handling surface. Devices such as motors, actuators, electromagnets, and the like, that are controlled by motion system 205 can be powered by power system 203 in embodiments where these devices are onboard the carrier. External power sources can also provide power in some embodiments, such as embodiments where a motive device, such as a Linear Synchronous Motor (LSM), provides motive force by energizing coils in the track. In some embodiments, motion system 205 controls devices on or off the carrier to provide motive force. In some embodiments, the motion system 205 works with other controllers, such as controllers in the track, to coordinate motive forces, such as by requesting nearby coils in the track be energized or requesting the movement of local rollers. In these embodiments, motion system 205 can work together with communication system 215 to move the carrier.

Transport system 200 may include the mixing handler 212 having one or more sensors to detect motion and/or confirm mixing. Mixing handler 212 may include sensors at the front or back of the transport system 200 for determining motion of a carrier. Exemplary sensors can include IR range-finding, magnetic sensors, microwave sensors, or optical detectors. Mixing handler 212 may include, in some embodiments, features configured to induce or enhance mixing during transport.

In some embodiments, mixing handler 212 may provide information to the controller 201 via the communication system 215. For example, in some embodiments, the mixing handler 212 observe the location and speed of carriers 114 on the handling surface 112 and evaluate mixing conditions and provide feedback to the controller 201. In other embodiments, mixing handler 212 may operate one or more mechanical features that induce or enhance mixing, such as contacting obstacles, agitators, or switches for moving a carrier to a portion of a track designated for mixing.

Transport system 200 can also include a position decoder 213. This sensor can extrapolate the carrier's position as described herein. For example, position decoder 213 can include a camera or other optical means to identify landmarks in the track, or observe optical encoding in the track. In some embodiments, position decoder 213 can also include inertial sensors, magnetic sensors, or other sensors sufficient to determine a carrier's current position, direction, velocity, acceleration, and/or jerk.

Transport system 200 can optionally include a barcode reader 214. If equipped with barcode reader 214, transport system 200 can observe the barcode of its payload at the time the samples are loaded onto the carrier or at any time thereafter. By reading and storing the identity of the sample tube, or conveying this information to the overall system, a transport system 200 may more efficiently determine which samples need to be mixed and enact mixing instructions for movement while samples that do not need mixing may simply be delivered to the station 120.

Communication system 215 can comprise any mechanisms sufficient to allow the carrier to communicate with the overall automation system. Communication system 215 may include a transceiver and antenna and logic for operating an RF communication protocol. In some embodiments, communication system 215 can also include near field communication, optical communication or electrical contact components.

In some embodiments, the transport system 200 can also include a status display module 216. The status display module 216 can include a controller and rewritable electronic display, such as an LCD panel or E-ink display. In some embodiments, the controller is treated as an addressable portion of memory, such that the controller 201 can easily update the status display 216.

In some embodiments, the transport system 200 also includes sample sensor 217. This sample sensor 217 can be used to indicate the presence or absence of a fluid container in a carrier's tube bracket (which may also be referred to as a tube holder). In some embodiments, this is a momentary mechanical switch that is depressed by the presence of a tube and not depressed when a tube is absent. This information can be used to determine the status of a tube, which can assist in the display of status information by status display module 216.

Figure 2:
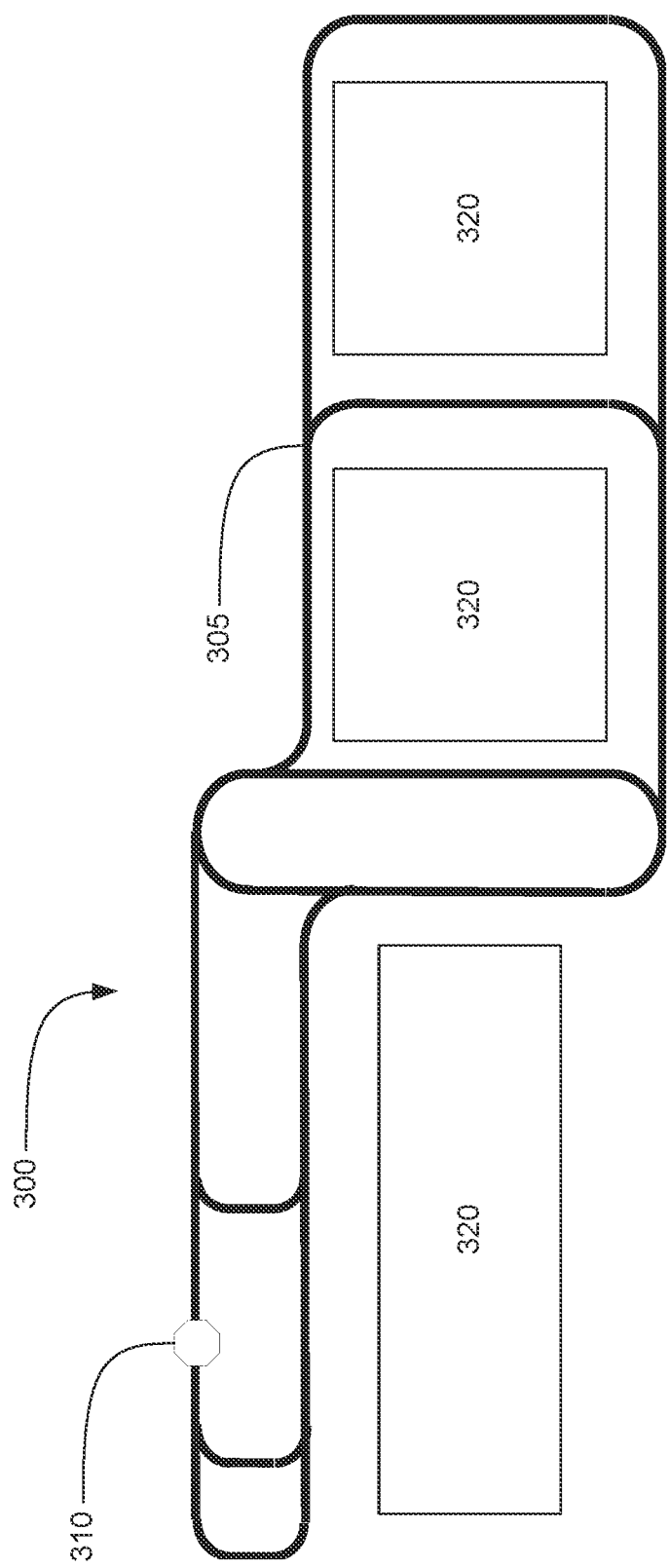
FIG. 2 is a top view of an exemplary sample testing system including a track-based transporting and mixing mechanism.

FIG. 2 shows one embodiment of a sample testing system 300 having a track system 305. Track 305 is a rectangular/oval/circular track on which sample carriers 310 move in a clockwise (or counterclockwise) direction between stations 320. Track 305 may be unidirectional or bidirectional. Carriers 310 can transport any suitable payload within a sample environment, such as fluid samples, reagents, or waste. Fluids, such as patient samples, can be placed in a container or vessel, such as a test tube, vial, cuvette, etc. that can be transported by a carrier 310. Carriers 310 and, by extension, payloads such as samples, can move on the main track 305 or be diverted via decision points. These decision points can be mechanical gates or other mechanisms suitable for allowing a sample to be diverted from a main track to a side track to arrive at one of the stations 320. When the reagents on track 305 reach the appropriate station 320, the module can utilize mechanical systems such as an arm or a feeder system that takes the reagents off of the track and places the reagents in the reagents store for the stations 320.

In some embodiments, the track system 305 can be designed to be bidirectional. This means that sample carriers can traverse the outside path and/or any sub-paths in either direction. In this way, the carriers 310 can be accelerated and decelerated and change directions in order to induce mixing of the sample carried during transport.

Carrier 310 may be a puck or other holder. Carrier 310 can hold different payloads in different embodiments. One payload can be a sample tube, which contains a fluid sample, such as blood or urine. Other payloads may include racks of tubes or reagent cartridges, or any other suitable cartridge. Carrier 310 may include a main body, which can house the internal electronic components. The main body can accept a payload. In some embodiments, this is a shallow hole that is designed to accept a fluid container such as a sample tube, and hold it with a friction fit. In some embodiments, the friction fit can be made using an elastic bore or a clamp that can be fixed or energized with a spring to create a holding force. In some embodiments, sample racks and reagent cartridges can be designed to also attach to the main body or an attached bracket, allowing carrier 310 to act as a universal base for multiple payload types.

Figure 3:
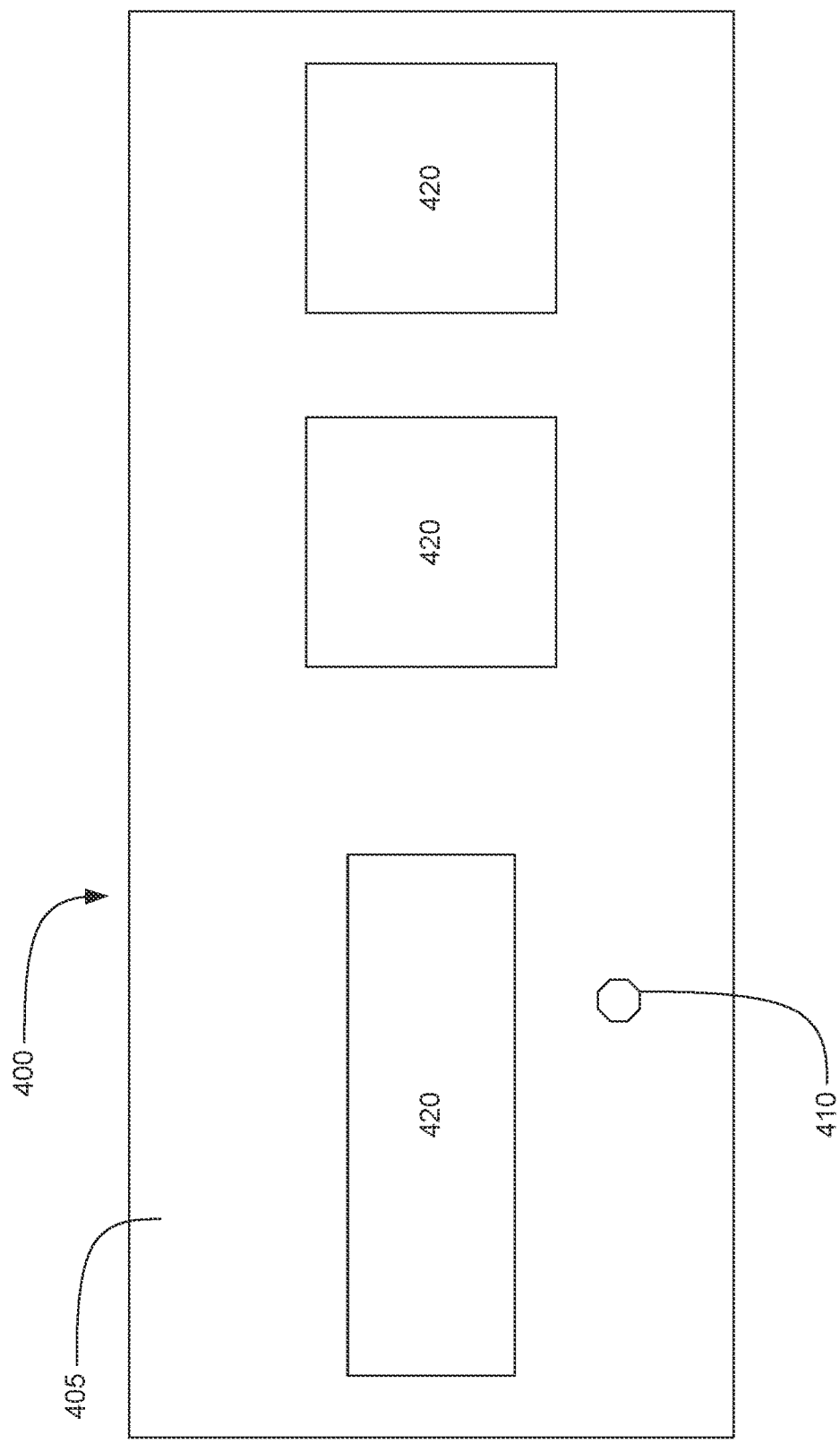
FIG. 3 is a top view of an exemplary sample testing system including an open-surface transporting and mixing mechanism.

FIG. 3 is an embodiment of another sample testing system 400 having an open-surface 405 for transport. Open-surface 405 is a surface without a limiting track for a carrier 410, thereby enabling motion in at least two-dimensions between stations 420. The components of the sample testing system 400 may be similar to that of sample testing system 300, except for the motion capabilities of the open-surface 405 in comparison to the track 305.

Figure 4:
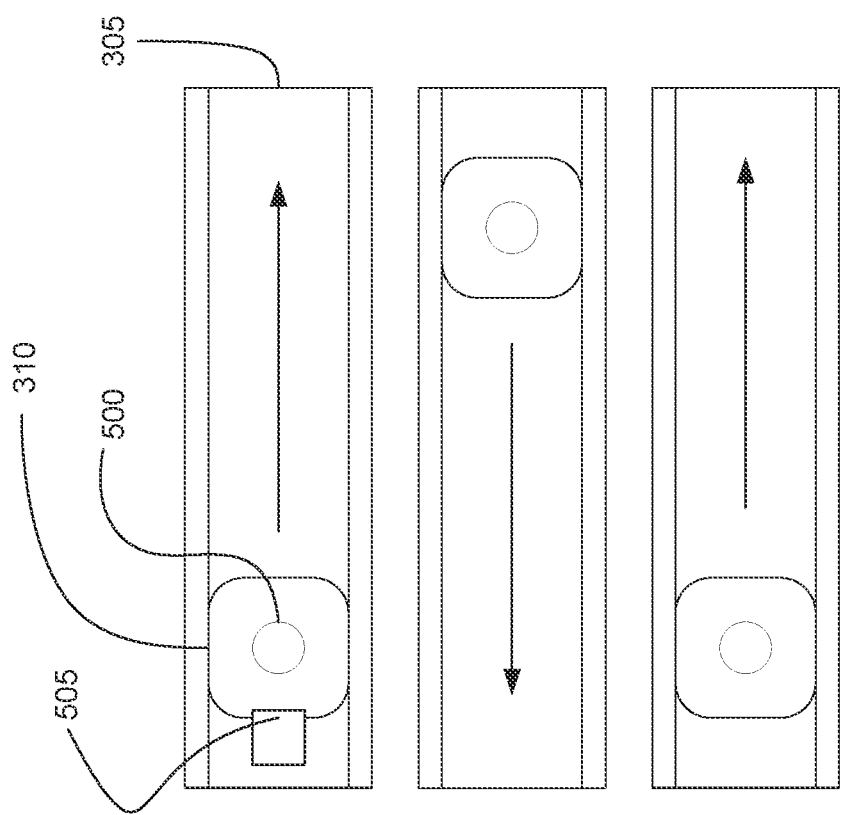
FIG. 4 is a top view of various steps for generating mixing through linear movement along a straight track.

FIG. 4 is an example of a first transport control option for mixing during transport of a sample tube 500 in a carrier 310 in a linear portion of the track 305. The first transport control option for mixing includes a control instruction to move the sample tube 500 back and forth on an existing section of track 305, using sudden acceleration and deceleration to cause the fluid in the sample tube 500 to slosh and mix.

Figure 5:
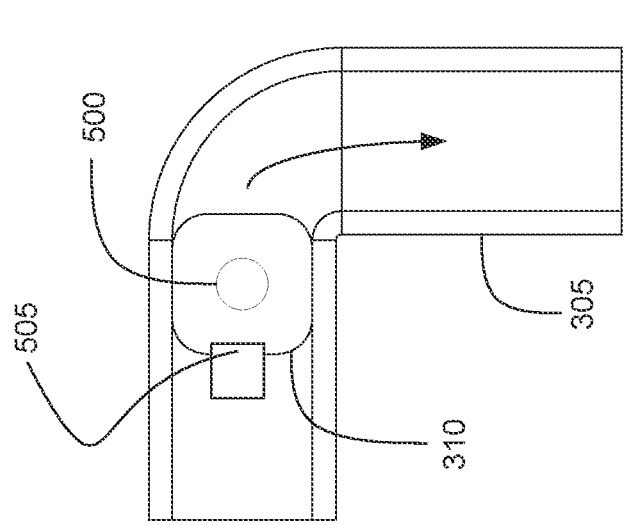
FIG. 5 is a top view of various steps for generating mixing through movement along a curved portion of track.
Figure 5:
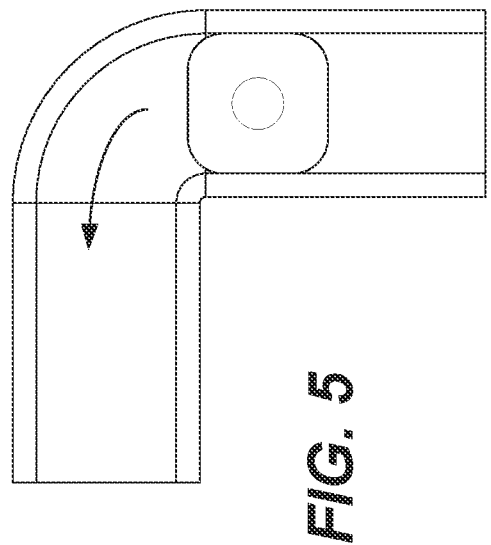

As shown in FIG. 4, track 305 may include a guide portion 505 on the track 305 which allows the carrier 310 to follow the path of the track 305. In some embodiments, the guide portion 505 is an element of the carrier 310. The guide portion 505 can include, for example, a slot to accept one or more rails on the track 305, providing lateral and/or vertical support. In some embodiments, the guide portion 505 allows the carrier 310 to be guided by walls 510 in the track 305, such as the walls of a trough-shaped track. The guide portion 505 can also include one or more drive mechanisms, such as friction wheels that allow a motor in the carrier 310 to drive the carrier 310 forward or backward on the track 305. The guide portion 505 can include other drive components suitable for use with the embodiments described throughout, such as magnets or induction coils. FIG. 5 illustrates movement along a curved section of the track 305. On the curved section of the track 305, additional centripetal forces would be applied to the fluid which causes a different mixing profile.

The controller 116 is configured to provide instructions to the guide portion 505 (e.g., on the carrier 310 and/or the track 305) to cause movement of the carrier 310 along the track 305 according to a desired movement profile for causing adequate mixing of the sample in the sample tube

500. For example, the controller 116 may cause several acceleration-deceleration cycles in one or more directions along the track 305 to cause sloshing and mixing of the material in the tube 500. In some embodiments, the movement profile selected by the controller 116 may depend on one or more factors, such as the status or profile information about the sample.

Figure 6:
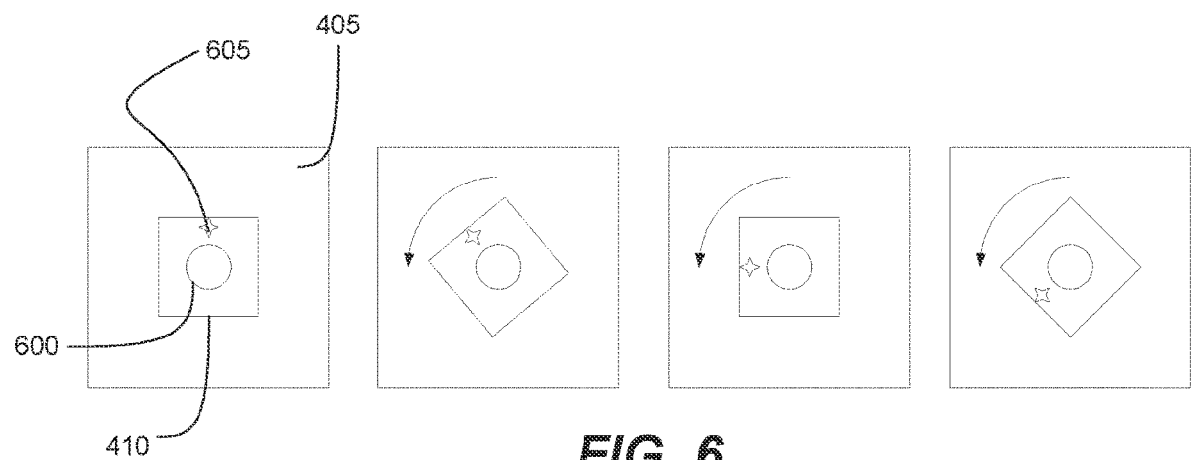
FIG. 6 is a top view of various steps for generating mixing through rotational motion on an open surface.

FIG. 6 is an example of an alternative transport control option for mixing on a transporter having an open-surface 405 as part of a transport mechanism that enables two- or three-dimensional movement of a carrier 410 (e.g., movement that is not limited to a particular path on a track). The carrier 410 may contain sample tubes 600 and have the freedom to move in and/or around at least an X and Y axis via a guide portion 605 associated with the carrier 410 and/or open space 405. For instance, the guide portion 605 may be a magnetic element on the carrier 410 configured to interact with an electromagnetic control element on the open space 405.

Figure 7:
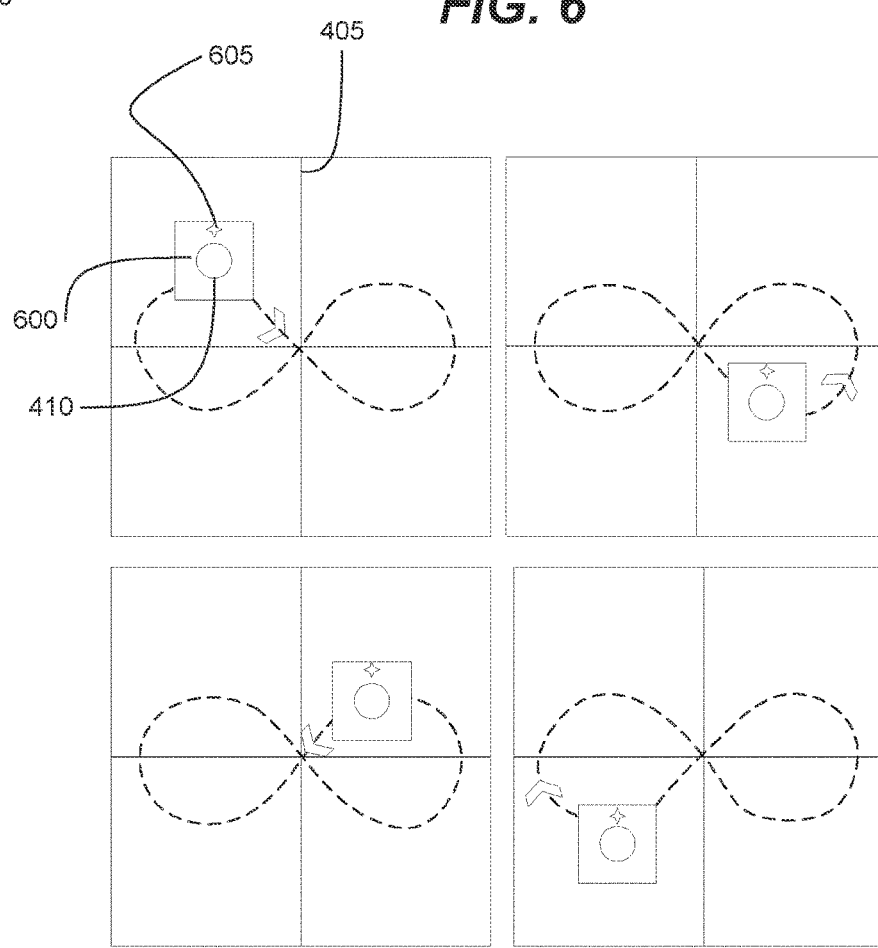
FIG. 7 is a top view of various steps for generating mixing through two-dimensional motion on an open surface.

The sample tubes 600 may be placed in the carriers 410 and are propelled along tiles and follow a predetermined path. In some embodiments, a motion profile can be developed to move the tubes in a fashion that will cause the sample tube to adequately mix. A first example, as shown in FIG. 6, is to spin the sample tubes on the tube transport which will cause sloshing of the fluid and induce mixing. A second example, as shown in FIG. 7, moves the carriers in a predetermined path to induce mixing of the fluid in the sample tube, such as a "figure-8" path.

The controller 116 may be configured to communicate with the carrier 410 and/or open surface 405 in order to provide instructions for controlling the path of the carrier 410 on the open surface 405. The controller 116 may identify a required level of mixing and select a movement profile to provide adequate mixing of the sample in the tube 600 while the tube 600 is on its way to a station 120. It should be understood that rotational path as shown in FIG. 6 and the "figure-8" path shown in FIG. 7 are exemplary and that other paths may be selected depending on various factors, including, e.g., the size of open surface 405, the capabilities of the guide portion 505, the sample, the degree of mixing required, an originating station 120, a destination station 120, etc.

Figure 8:
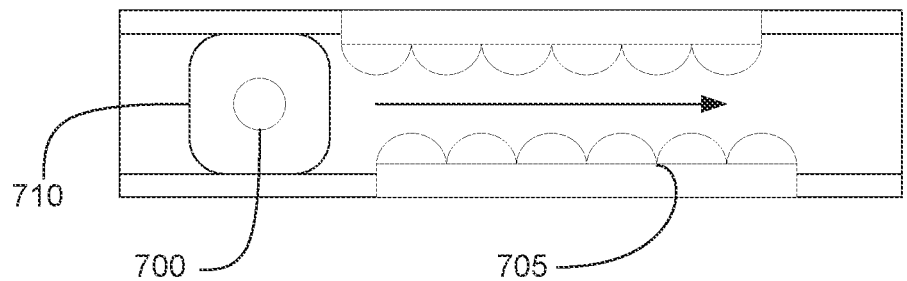
FIG. 8 is a top view of an alternative embodiment for generating mixing through linear movement along a straight track.
Figure 9:
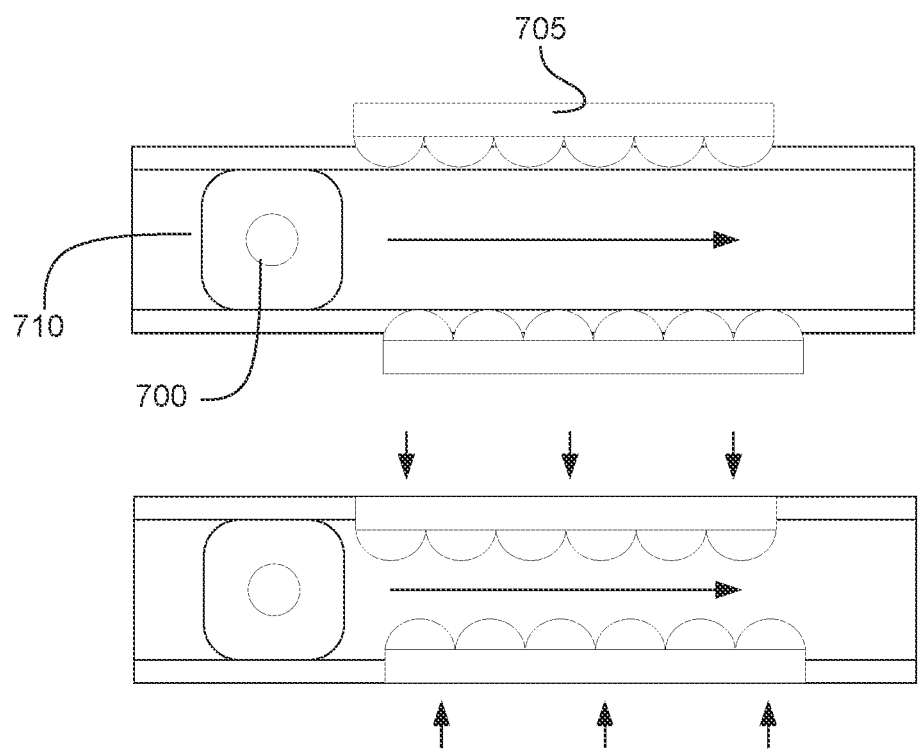
FIG. 9 is a top view of various steps of another alternative embodiment for generating mixing through linear movement along a straight track.

FIGS. 8 and 9 are examples of yet another alternative transport control option for mixing, including a mixing element 705 configured to contact and/or otherwise interact with a sample tube 700 and/or a carrier 710 holding the sample tube 700. In some embodiments, the mixing element 705 may be a set of obstacles configured to contact the sample tube 700 during transport. For instance, the mixing elements 705 may be a set of undulating curves configured to move and/or impact the sample tube 700 and cause sloshing and/or mixing. In another embodiment, the mixing element 705 may be, for example, an agitator configured to shake the track, carrier, and/or sample 700. As shown in FIG. 9, the mixing elements 705 may be selectively moved into place in order to selectively control mixing of only certain samples that pass along the track. For instance, the controller 116 may provide instructions to the mixing element 705 to move the obstacles in place when a particular sample requires mixing when it is being transported by the sample transport system.

In an exemplary embodiment, an operator or an origination station or the sample transport system scans the barcode of a sample tube and places it in a carrier, the controller determines the identity of the carrier and matches it with the identity of the sample. The controller then may locate the record for the sample to determine a mixing instruction for the sample. The mixing instruction may include, for example, a determination of whether the sample needs to be mixed during transport (e.g., yes or no answer to mixing). In another embodiment, the mixing instruction may include a motion profile that will induce an adequate degree of mixing during transport. The controller may select, for example, from a plurality of stored movement profiles depending on the degree of mixing required.

Once the carrier is placed onto the transporter, the routing capabilities and location acquisition systems of the sample transport system enable the controller to determine where it the carrier is on the transporter (e.g., location on the track) and where it needs to go on the transporter. The controller may provide a movement profile to a relevant component to provide motive force to cause the carrier to move in a certain way on its way to a destination station. The movement profiles may include and/or define, for example, acceleration and deceleration in one or more directions and/or along curved paths, rotational motion, curvilinear free motion on an open surface, interaction with one or more mixing elements, or other motion configured to cause mixing before delivering the sample to a destination station. As a result, a sample transport system may also be a mixing mechanism that provides mixing in combination with delivery of a sample to a station, such as an analyzer. As a result, sample handling systems may not be required to have separate mixing-dedication stations or systems, enhancing efficiency and reducing overall costs of such systems.

It should be understood that the disclosed embodiments are exemplary and the other embodiments may include other features for inducing motion that is a combination of transport and mixing of a sample. For example, motive force can be provided to the carriers in many ways. In some embodiments, the track actively participates in providing individualized motive force to each carrier. In some embodiments, motive force is provided by electromagnetic coils in the track that propel one or more magnets in the carrier. These traditional systems utilizing this magnetic motion system have included passive carriers that lack the integrated intelligence of the carriers described herein, and all routing and decisions are made by a central controller with no need for active carriers that participate in the routing and identification process.

In embodiments that utilize magnetic motion, the electromagnetic coils and the magnets operate as an LSM to propel each individual carrier in the direction chosen with precise control of velocity, acceleration, and jerk. Where each coil on the track (or a local set of coils) can be operated independently, this allows highly localized motive force to individual carriers such that individual carriers can move with their own individually tailored accelerations and velocities. Coils local to a carrier at any given moment can be activated to provide precise control of the direction, velocity, acceleration, and jerk of an individual carrier that passes in the vicinity of the coils.

In some embodiments, a track may be comprised of many individually articulable rollers that act as a locally customizable friction track. Because individual micro-sections of the track can be managed independently, rollers immediately around a carrier may be controlled to provide individualized velocity, acceleration, and jerk. In some embodiments, other active track configurations can be used that provide localized individual motive force to each carrier.

In some embodiments, the track may be largely passive, providing a floor, walls, rails, or any other appropriate limitations on the motion of a carrier to guide the carrier along a single dimension. In these embodiments, the motive force is provided by the carrier itself. In some embodiments, each individual carrier has one or more onboard motors that drive wheels to provide self-propelled friction-based motive force between the track and the carrier. Unlike traditional friction tracks, where the track is a conveyor, carriers with driven wheels can traverse the track independently and accelerate/decelerate individually. This allows each carrier to control its velocity, acceleration, and jerk at any given moment to control the forces exerted on its payload, as well as traverse the track along individually tailored routes. In some embodiments, permanent magnets may be provided in the track and electromagnets in the carrier may be operated to propel the carrier forward, thereby acting as an LSM with the carrier providing the driving magnetic force. Other passive track configurations are also contemplated, such as a fluid track that allows carriers to float and move autonomously via water jets or the like, a low friction track that allows carriers to float on pockets of air provided by the track, (e.g., acting like a localized air hockey table), or any other configuration that allows individual carriers to experience individualized motive forces as they traverse the track.

Embodiments of the present invention may be integrated with existing analyzers and automation systems. It should be appreciated that carriers may be configured in many shapes and sizes, including layouts and physical configurations suitable for use with any contemplated analyzer or instrument. For example, in some embodiments, a carrier may include multiple slots for carrying multiple samples around an automation track. One embodiment, for example, may include a physical layout of a tube-holding portion of a carrier with multiple slots in one or more transport racks. Each rack may include multiple slots (e.g., five or more slots), each slot configured to hold a tube (e.g., a sample tube).

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A sample transport and mixing system, comprising:
    a carrier configured to hold a sample tube for a sample to be transported and mixed;
    a transporter configured to support the carrier;
    a guide portion configured to impart motion to the carrier on the transporter and deliver the carrier to a destination location; and
    a controller configured to:
        identify instructions associated with the sample, the instructions including a movement profile configured to cause sufficient mixing of the sample in the carrier to achieve a mixed sample for sample testing, such that a separate mixing mechanism is not required,
        communicate with the guide portion to cause the carrier to:
            follow the movement profile on the transporter to cause the mixing of the sample, and
            deliver the mixed sample to the destination location for sample testing.

2. The sample transport and mixing system of claim 1, wherein the transporter comprises a track defining a bounded path.

3. The sample transport and mixing system of claim 2, wherein the movement profile includes acceleration and deceleration of the carrier along the bounded path.

4. The sample transport and mixing system of claim 3, wherein the movement profile includes acceleration and deceleration of the carrier in two directions along the bounded path.

5. The sample transport and mixing system of claim 3, wherein the movement profile includes acceleration and deceleration along a linear path only.

6. The sample transport and mixing system of claim 2, wherein the bounded path includes a curved portion for inducing centripetal force upon the sample for mixing.

7. The sample transport and mixing system of claim 6, wherein the movement profile includes movement in two directions along the curved portion of the bounded path.

8. The sample transport and mixing system of claim 1, wherein the transporter is an open-surface such that the carrier is configured to freely move along a plurality of paths on the transporter.

9. The sample transport and mixing system of claim 8, wherein the movement profile includes rotation of the carrier on the open-surface transporter.

10. The sample transport and mixing system of claim 8, wherein the movement profile includes a curvilinear path on the open-surface transporter.

11. The sample transport and mixing system of claim 10, wherein the curvilinear path comprises a figure-8 path.

* * * * *